United States Patent Office 3,511,813
Patented May 12, 1970

3,511,813
PREPARATION OF UNSATURATED URETHANE PREPLOYMERS FROM POLYEPICHLOROHYDRINS
Perry A. Argabright, Joe T. Kelly, and Vernon J. Sinkey, Littleton, Colo., assignors to Marathon Oil Company, Findlay, Ohio, a corporation of Ohio
No Drawing. Filed Sept. 22, 1966, Ser. No. 581,148
Int. Cl. C08g 22/00, 22/34
U.S. Cl. 260—77.5                                                11 Claims

ABSTRACT OF THE DISCLOSURE

Isocyanurate-containing unsaturated polyurethanes can be produced by reacting a metal cyanate with a hydroxyl-containing halogenated polyether in an aprotic solvent.

---

The present invention relates to new urethane-containing compositions and processes for their preparation, and in particular relates to urethanes which contain isocyanurate groups within the molecule and to processes for preparing such urethanes by the reaction of hydroxyl-containing halogenated polyethers with metal cyanate in aprotic solvents.

The durability of urethane polymers is well known. Halogens are useful substituents in polymeric molecules because they lend flame-retardancy to the resulting polymer. Reactive double bonds are useful to permit subsequent curing via cross-linking or other polymerization methods with close control of elastomeric properties. Isocyanurate groups promote thermostability of molecules and resulting polymers. The present invention, through new techniques, produces compositions hitherto unavailable which contain all four of the above mentioned desirable groups, that is, urethanes, halogens, reactive double bonds, and isocyanurate rings. Further, the processes of the present invention permit the production of these new chemical compositions in a single step reaction with no product purification steps other than filtration (to remove inorganic salts) and recovery of solvent. The entire product mixture can be further reacted to form valuable flame retardant, thermally stable urethane polymer coatings, drying oils, elastomers, castables, fibers and films.

According to the present invention, metal cyanates are reacted with hydroxyl-containing halogenated polyethers in aprotic solvents to form isocyanurate-containing unsaturated polyurethanes.

The metal cyanates employed in the present invention can be alkali metal cyanates, e.g. sodium, potassium, lithium, cesium; alkaline earth metals, e.g. calcium, strontium, silver and other metal cyanates. Most preferred are the alkali metal cyanates, particularly sodium and potassium cyanates.

The halogenated hydroxyl-containing polyethers of the present invention include polyepichlorohydrins, preferably having molecular weights between about 400 and about 3000; polyepibromohydrins, preferably having molecular weights of from about 500 to about 4000, and chlorobromohydrins. The preferred hydroxyl-containing halogenated polyethers contain an average of from about 1 to about 10 and more preferably from about 1.5 to about 2.5 hydroxyl groups per molecule of the halogenated polyether. Preferably, the reaction mixture will contain from about 0.3 to about 3 moles of metal cyanate for each mole of hydroxyl-containing halogenated polyether present in the reaction mixture.

By aprotic solvents is meant compositions which are liquid under the conditions of the reaction, which have a high dielectric constant, (greater than about 15 at 25° C.), which are dipolar, that is, one part of the molecule has a more positive electrical charge relative to the other parts of the molecule causing the molecule to act as a dipole, are sufficiently inert not to enter into deleterious side reactions to a significant degree under the reaction conditions, and which do not possess hydrogen atoms capable of hydrogen bonding with, or transferring to, anions in solution in the reaction mixture. The aprotic solvent can be composed of a mixture of liquids so long as the over-all liquid compositions meet the above criteria.

The preferred aprotic solvents for the practice of the present invention are N, N-dialkylamides, e.g., dimethylformamide (DMF), diethylacetamide, N-alkylpyrrolidones, e.g., N-methylpyrrolidones, and N-butylpyrrolidones. Hexa-substituted phosphoramides, e.g., hexamethylphosphoramide; tetra-substituted ureas, e.g., tetramethylurea, and N, N-dimethyl, N, N'-dipropyl urea; sulfoxides, dimethylsulfoxide, and diphenylsulfoxide; sulphones, e.g., dimethylsulphone, tetramethylenesulphone, nitriles, e.g., acetonitrile, benzonitrile. The most preferred solvent for the purposes of the present invention is dimethylformamide.

Preferably from 3 to 10 liters of aprotic solvent will be present for each mole of polyepichlorohydrin or other halogenated hydroxyl-containing polyether in the reaction zone.

In general, there will preferably be present in the reaction mixture from 0.05 to about 5 and more preferably from 0.1 to about 1 mole of cyanate groups in the form of metal cyanate for each mole of halogen groups present in the form of halogenated hydroxyl-containing polyethers.

While the present invention is not intended to be restricted by any particular theory of operation, it seems apparent that the cyanate ion displaces chlorine groups on the one hand, and affects the elimination of hydrogen halide on the other hand. As shown in Example 2, 64% of those chlorines which react are replaced by NCO groups, while the remaining 36% of the chlorine which reacts produces double bonds by hydrogen halide elimination. The NCO groups thus formed subsequently react with themselves to form isocyanurate groups or alternatively react with hydroxyl groups to form urethane groups.

The products of the present invention thus comprise molecules which contain the isocyanurate group, the urethane group, thet halogen group, and double bonds. The relative content of each of these functional moieties may be controlled by varying the ratios of metal cyanate to chlorine contained in the hydrogenated hydroxyl-containing polyether. When the preferred polyepichlorohydrin is utilized in the present invention the double bonds in the product are in the form of desirable reactive vinyl ether groups.

In especially preferred embodiments of the present invention, pendant blocked isocyanate groups can be introduced by carrying out the above described reactions in the additional presence of from about 0.1 to 10, preferably from about 0.5 to about 5 moles of preferably $C_1$ to $C_6$ non-halogenated alcohol per mole of cyanate group present in the reaction mixture. These pendant blocked isocyanate groups are especially valuable in permitting such products to be further reacted with polyamides, to form valuable baked-on coatings. The invention can alternatively be carried out as described above with the halogenated polyether being the only hydroxyl-containing moiety.

The reactions of the present invention are preferably conducted at a temperature of from about 25 to about 300° C. and most preferably at from 50 to about 150° C. Pressure is not critical and may be from below one atmosphere to over 10,000 p.s.i.g. In most cases, it will be preferable to conduct the reaction anaerobically on a batch-type basis, although flow systems may be utilized. The most convenient apparatus will in most cases, be a conventional tight-lid varnish cooker or similar reactor having a reflux condenser, provision for agitation, and the usual controls for temperature and pressure.

The present invention will be more fully understood by reference to the illustrative examples which follow. These examples are to be taken as merely illustrative of certain embodiments of the invention and the claims appended hereto are to be considered as including all of the obvious variations and modifications to which the invention is adaptable which would be obvious to persons skilled in the art from a reading of the present specification.

EXAMPLE 1

The apparatus used in this and all of the following examples comprises a 3-necked round bottom glass reactor equipped with paddle type stirrer, reflux condenser terminated with an adapter to maintain a nitrogen atmosphere in the reactor, thermometer and thermoregulator. The reactor is heated by means of a mantle.

The reactor is charged with 38.7 g. of polyepichlorohydrin (PECH), (M.W. 900) 41.8 mmoles, 30 ml. of dry DMF and 3.39 g. of KNCO (41.8 mmoles). The reaction mixture is stirred vigorously under a nitrogen atmosphere at 100° C. for 24 hours. After cooling to room temperature, the reaction mixture is filtered to remove the insoluble inorganic phase. The DMF is then removed from the organic phase by vacuum distillation. The resulting product is a clear dark viscous oil containing 31.1% Cl and 1.52% N. This corresponds to 98% of the reacted chlorine going to NCO and 2% of the chlorine eliminating. The presence of urethane groups, isocyanurate, and vinyl ethers is shown by IR spectra. The presence of unsaturation is further confirmed by the reaction with catalytic amounts of BF$_3$ etherate to yield a cross-linked elastomeric product.

The following examples were carried out using the same procedure as Example 1.

EXAMPLE 16

A coating solution is prepared by mixing 8.75 g. of product from Example 12 with 3.15 g. of Versamid 115, amine resin derived from dimerized fatty acid and having an amine number of about 210–220 and 12 milliliters of xylene. The solution is applied to an aluminum panel and baked at 160° C. for one half hour. The resulting coating has good sheen, good adhesion and is flame retardant.

EXAMPLE 17

A coating solution is prepared by mixing 2.25 g. of the product from Example 15 with 1.85 g. of Versamid 115, amine resin derived from dimerized fatty acid and having an amine number of about 210–220 and 4.0 g. of DMF. The solution is applied to aluminum panels and baked at 160° C. for one half hour. The resulting coating exhibits good sheen, good adhesion and flexibility and excellent flame retardancy.

What is claimed is:

1. A process for the preparation of isocyanurate-containing unsaturated polyurethanes comprising reacting a metal cyanate with a polyepihalohydrin containing an average of 1 to about 10 hydroxyl groups per molecule in an aprotic solvent.

2. The process of claim 1 wherein the reaction is conducted at a temperature of from about 25 to 300° C.

3. The process of claim 1 wherein the halogenated polyether is the only hydroxyl-containing moiety in the reaction mixture.

4. The process of claim 1 wherein the metal cyanate is an alkali metal cyanate.

5. The process of claim 1 wherein the metal cyanate is potassium cyanate.

6. The process of claim 1 wherein the aprotic solvent is selected from the group consisting of dialkylamides, N-alkylpyrrolidones, hexa-alkyl phosphoramides.

7. The process of claim 4 wherein the reaction mixture contains from 0.3 to about 3 moles of metal cyanate for each mole of hydroxyl-containing halogenated polyether present in the reaction mixture.

8. The process of claim 1 wherein there is present in the reaction mixture a non-halogenated alcohol and wherein

| Example | KNCO/PECH | Temp., °C. | Time hrs. | Percent Cl | Percent N | Percent reacted Cl to NCO | Percent reacted Cl to eliminate |
|---|---|---|---|---|---|---|---|
| 2 | 3.0 | 100 | 4 | 31.8 | 0.81 | 64.0 | 36.0 |
| 3 | 3.0 | 100 | 8 | 26.7 | 2.52 | 74.0 | 26.0 |
| 4 | 3.0 | 100 | 16 | 25.7 | 2.29 | 70.0 | 30.0 |
| 5 | 3.0 | 100 | 24 | 23.6 | 3.00 | 66.6 | 33.3 |
| 6 | 3.0 | 100 | 24 | 24.9 | 3.20 | | |
| 7 | 3.0 | 75 | 24 | 33.2 | 0.52 | 73.2 | 26.8 |
| 8[1] | 3.0 | 125 | 4 | 24.4 | 3.41 | 81.5 | 18.5 |
| 9[1] | 6.0 | 100 | 24 | 23.8 | 3.41 | 73.8 | 26.2 |
| 10[2] | 3.0 | 100 | 24 | 26.58 | 2.04 | 51.7 | 48.3 |
| 11[2] | 1.0 | 100 | 24 | 34.85 | 0.95 | 70.6 | 29.4 |

[1] Product is an insoluble solid whereas all other products are viscous oils
[2] Polyepichlorohydrin (M.W. 1,150) whereas other examples were carried out with polyepichlorohydrin, M.W. 900.
KNCO/PECH means the mole ratio of potassium cyanate to polyepichlorohydrin.

The following examples are carried out as in Example 1, but with another alcohol (ethanol) present as a trapping agent.

the alcohol is present in an amount equivalent to from 0.1 to about 10 moles of non-halogenated alcohol per mole of cyanate present in the reaction mixture.

| Example | KNCO/PECH | Temp., °C. | Time hrs. | Trap* M/M PECH | percent Cl | Percent N | Percent reacted Cl to urethane | Percent reacted Cl to eliminate |
|---|---|---|---|---|---|---|---|---|
| 12[1] | 3 | 100 | 24 | 6.0 | 24.7 | 2.60 | 63.7 | 36.3 |
| 13[1] | 3 | 75 | 24 | 6.0 | 30.6 | 1.24 | 71.5 | 28.5 |
| 14[2] | 3 | 100 | 24 | 6.0 | 25.8 | 2.65 | 68.5 | 31.5 |
| 15[3] | 3 | 100 | 24 | 6.0 | 13.7 | 5.26 | 69.0 | 31.0 |

[1] Polyepichlorohydrin, M.W. 900.
[2] Polyepichlorohydrin, M.W. 1,150.
[3] Polyepichlorohydrin, M.W. 450.
KNCO/PECH means the mole ratio of potassium cyanate to polyepichlorohydrin.
* Trap M/M PECH means moles of trapping agent, e.g., alcohol per mole of polyepichlorohydrin.

9. The process of claim 8 wherein the non-halogenated alcohol contains from 1 to 6 carbon atoms and wherein the halogenated polyether contains an average of from 1.5 to 2.5 hydroxyl groups per molecule of the halogenated polyether.

10. The process of claim 1 wherein there are present in the reaction mixture from 3 to about 10 liters of aprotic solvent per mole of halogenated hydroxyl-containing polyether.

11. Unsaturated isocyanurate-containing polyurethanes which contain at least one vinyl ether group in each isocyanurate-containing polyurethane molecule comprising the reaction product of polyepihalohydrin containing from 1 to about 10 hydroxyl groups per molecule with metal cyanate in an aprotic solvent.

References Cited

UNITED STATES PATENTS

| | | | |
|---|---|---|---|
| 2,697,720 | 12/1954 | Kaiser | 260—248 |
| 2,866,801 | 12/1958 | Himel et al. | 260—453 |
| 3,037,979 | 6/1962 | Fukui et al. | 260—248 |
| 3,370,077 | 2/1968 | Hartzell | 260—77.5 XR |
| 3,379,687 | 4/1968 | Doss et al. | 260—47 |

DONALD E. CZAJA, Primary Examiner

M. J. WELSH, Assistant Examiner

U.S. Cl. X.R.

117—161